United States Patent [19]

Menn

[11] 3,810,992

[45] May 14, 1974

[54] ANTHELMINTIC BIS-THIOUREIDO BENZENE DERIVATIVE

[75] Inventor: Julius Joel Menn, Saratoga, Calif.

[73] Assignee: Stauffer Chemical Company, New York, N.Y.

[22] Filed: Sept. 2, 1971

[21] Appl. No.: 177,471

[52] U.S. Cl. ............................................... 424/300
[51] Int. Cl. ............................................... A61k 27/00
[58] Field of Search ........................... 424/300, 322

[56] References Cited
OTHER PUBLICATIONS
Chemical Abstracts, Vol. 71 (1969), p. 70347h

*Primary Examiner*—Vincent D. Turner
*Attorney, Agent, or Firm*—Daniel C. Block

[57] ABSTRACT

This invention relates to the control of internal parasites. More specifically, this invention relates to the use of anthelmintic active compounds defined by the following formula:

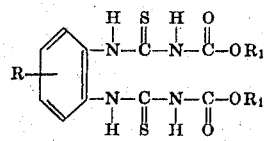

wherein R can be hydrogen, nitro, halogen or lower alkyl group and $R_1$ is a lower alkyl group.

1 Claim, No Drawings

ANTHELMINTIC BIS-THIOUREIDO BENZENE DERIVATIVE

DESCRIPTION OF THE INVENTION

It has been discovered that certain bis-thioureido benzene compounds possess high anthelmintic activity. The compounds of this invention correspond to the following formula:

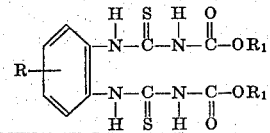

wherein R can be selected from the group consisting of hydrogen, nitro, halogen, or lower alkyl and $R_1$ is a lower alkyl group.

A 50 percent wettable powder of 1,2-bis[(3-ethoxycarbonyl)thioureido] benzene was made up with water and dosed orally, by drenching bottle, to sheep, the volume given being approximately 50 ml. per animal.

One aminal was given 20 mg/kg a.i., another 40 mg/kg a.i., another 50 mg/kg a.i., and another 60 mg/kg a.i. The faeces passed by the sheep were collected for a day after treatment and mixed with water so that samples could be taken for estimation of the numbers of small worms expelled, and the whole output sieved for large species.

Three days post-dosing the sheep were killed and the worms left in the intestinal tract counted by the usual methods, i.e. dilution counts for the smaller worms and direct sieve counts for the larger ones. The results are tabulated in Table I.

TABLE I

| Genus | Worms Expelled | Worms Retained | % Expelled | Worms Expelled | Worms Retained | % Expelled |
|---|---|---|---|---|---|---|
| Ostertagia | 100 | 0 | 100 | — | NOT TESTED | — |
| Trichostrongylus | 1750 | 0 | 100 | — | do. | — |
| Chabertia | 1 | 0 | 100 | — | do. | — |
| Oesophagostomum Venulosum | — | NOT TESTED | — | — | NOT TESTED | — |
| Nematodirus | — | do. | — | — | NOT TESTED | — |
| Haemonchus | — | NOT TESTED | — | — | 100% Effective | — |

| | | 40 | | | 20 | |
| Genus | Worms Expelled | Worms Retained | % Expelled | Worms Expelled | Worms Retained | % Expelled |
|---|---|---|---|---|---|---|
| Ostertagia | 50 | 0 | 100 | 0 | 200 | 0 |
| Trichostrongylus | 1500 | 3 | 98 | 1300 | 0 | 100 |
| Chabertia | 112 | 0 | 100 | 89 | 2 | 98 |
| Oesophagostomum Venulosum | 24 | 5 | 83 | 79 | 16 | 83 |
| Nematodirus | — | NOT TESTED | — | 200 | 0 | 100 |
| Haemonchus | — | NOT TESTED | — | — | INEFFECTIVE | — |

The manner of synthesizing the compounds of this invention are described in the prior art. They are also described as having fungicidal activity. However, the use of the compounds to control internal parasites is not known or described in the prior art.

The compounds of this invention can be administered to the habitat of the parasites to be controlled in any convenient manner, such as wettable preparations, aqueous solutions, emulsions, powdery preparations and the like, in combination with diluents such as diatomaceous earth, kaolin, clay, talc, vegetable or mineral oils and the like. The amount of active compound administered will of course vary depending on the species of parasite sought to be controlled.

In order to illustrate the merits of the present invention, the following evaluation tests were conducted.

What is claimed is:

1. A method of controlling helminths in sheep which comprises the oral administration to sheep in need of such control an anthelmintically effective amount of a compound corresponding to the following formula:

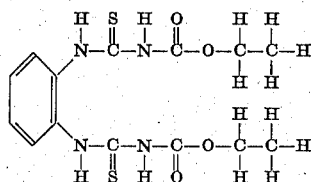

wherein R is hydrogen and $R_1$ is ethyl.

* * * * *

UNITED STATES PATENT OFFICE
CERTIFICATE OF CORRECTION

Patent No. 3,810,992  Dated May 14, 1974

Inventor(s) Julius J. Menn

It is certified that error appears in the above-identified patent and that said Letters Patent are hereby corrected as shown below:

Under the heading "Table I" please insert the sub-heading ---mg/kg of Body Weight---; over the first set of three columns entitled "Worms Expelled", "Worms Retained" and "% Expelled" insert the numeral ---60---; and over the second set of three columns entitled "Worms Expelled", "Worms Retained" and "% Expelled" insert the numeral ---50---.

In Column 2, line 55, omit the line reading "wherein R is hydrogen and $R_1$ is ethyl."

Signed and sealed this 1st day of October 1974.

(SEAL)
Attest:

McCOY M. GIBSON JR.
Attesting Officer

C. MARSHALL DANN
Commissioner of Patents

Notice of Adverse Decision in Interference

In Interference No. 99,307, involving Patent No. 3,810,992, J. J. Menn, ANTHELMINTIC BIS-THIOUREIDO BENZENE DERIVATIVE, final judgment adverse to the patentee was rendered Nov. 15, 1976, as to claim 1.

[*Official Gazette March 22, 1977.*]

Disclaimer 3,810,992.—*Julius Joel Menn*, Saratoga, Calif. ANTHELMINTIC BIS-THIOUREIDO BENZENE DERIVATIVE. Patent dated May 14, 1974. Disclaimer filed Nov. 1, 1976, by the assignee, *Stauffer Chemical Company*.

Hereby enters this disclaimer to claim 1 of said patent.

[*Official Gazette August 16, 1977.*]